US009477756B1

(12) United States Patent
Park

(10) Patent No.: US 9,477,756 B1
(45) Date of Patent: Oct. 25, 2016

(54) CLASSIFYING STRUCTURED DOCUMENTS

(75) Inventor: Thomas Robert Park, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/350,951

(22) Filed: Jan. 16, 2012

(51) Int. Cl.
*G06F 17/30* (2006.01)
*G06F 17/27* (2006.01)

(52) U.S. Cl.
CPC ... *G06F 17/30864* (2013.01); *G06F 17/30707* (2013.01); *G06F 17/272* (2013.01)

(58) Field of Classification Search
CPC .................................................. G06F 17/30873
USPC ........................................................ 707/739
See application file for complete search history.

(56) References Cited

U.S. PATENT DOCUMENTS

| | | | |
|---|---|---|---|
| 7,275,069 B2* | 9/2007 | Hundley et al. | 707/737 |
| 7,895,515 B1* | 2/2011 | Oliver et al. | 715/237 |
| 8,005,782 B2* | 8/2011 | Reznik et al. | 706/52 |
| 8,539,000 B2* | 9/2013 | Solmer | G06K 9/00442 707/803 |
| 2004/0215606 A1* | 10/2004 | Cossock | 707/3 |
| 2005/0267915 A1* | 12/2005 | Zhulong et al. | 707/200 |
| 2006/0004748 A1* | 1/2006 | Ramarathnam et al. | 707/6 |
| 2006/0288015 A1* | 12/2006 | Schirripa et al. | 707/100 |
| 2009/0049062 A1* | 2/2009 | Chitrapura | G06F 17/30896 |
| 2012/0158724 A1* | 6/2012 | Mahadevan et al. | 707/737 |
| 2012/0215853 A1* | 8/2012 | Sundaram et al. | 709/206 |

OTHER PUBLICATIONS

Boyan, J. "A Machine Learning Architecture for Optimizing Web Search Engines" School of Computer Science, Carnegie Mellon University, May 10, 1996, pp. 1-8 [online] [retrieved on Jan. 7, 2012] retrieved from: http://www.cs.cornell.edu/people/tj/publications/boyan_etal_96a.ps.gz.

Lacoste-Julien, S. "Discriminative Machine Learning with Structure" Electrical Engineering and Computer Sciences, University of California at Berkeley, Technical Report No. UCB/EECS-2010-4, Jan. 12, 2010, pp. 1-148 [online] [retrieved on Jan. 7, 2012] retrieved from: http://www.eecs.berkeley.edu/Pubs/TechRpts/2010/EECS-2010-4.pdf.

Cline, M. "Utilizing HTML Structure and Linked Pages to Improve Learning for Text Categorization" Department of Computer Sciences, University of Texas at Austin, Undergraduate Honors Thesis, May 1999, pp. 1-21 [online] [retrieved on Jan. 7, 2012] retrieved from: http://www.cs.utexas.edu/~ml/papers/mbcline-ugthesis.pdf.

* cited by examiner

*Primary Examiner* — Brittany N Allen
(74) *Attorney, Agent, or Firm* — Lee & Hayes, PLLC

(57) ABSTRACT

Technologies are described herein for classifying structured documents based on the structure of the document. A structured document is received, and the structural elements are parsed from the document to generate a text string representing the structure of the document instead of the semantic textual content of the document. The text string may be broken into N-grams utilizing a sliding window, and a classifier trained from similar structured documents labeled as belonging to one of a number of document classes is utilized to determine a probability that the document belongs to each of the document classes based on the N-grams.

21 Claims, 6 Drawing Sheets

PHOTO SHACK

*November 2010 Newsletter*

CAMERAS | LENSES | BAGS | MEMORY CARDS | ACCESSORIES

Photosonic PREMIER Digital Color Camera

★★★☆☆ (62 Ratings) More about this product

Your Price: ~~$599~~ $399 + shipping and handling

*Customers Say*

LOW LIGHT - "I LOVE TAKING PICTURES AND REALLY WANTED ONE THAT DID GREAT LOW LIGHT PICTURES AND THIS DEFINITELY TAKES GREAT PICTURES WITH VERY LITTLE LIGHT." *READ MORE...*

SLR - "IT IS A GREAT CAMERA THAT IT COMPARABLE TO ANY SLR CAMERA." *READ MORE...*

ZOOM - "ALSO THE VIDEO IS JUST AS HIGH QUALITY, YOU CAN OPTICALLY ZOOM DURING VIDEO RECORDING, AND THE FOCUS SEEMS QUICKER DURING ZOOMING." *READ MORE...*

*READ MORE FROM OUR CUSTOMERS...*

*While supplies last – shipping and handling not included – offer good through 12/31/2010*
PHOTO SHACK, INC. | 2010 PARKWAY POINTE DR. | ATLANTA, GA 30303
If you do not wish to receive future newsletters from Photo Shack: *click here*

CLASSIFYING STRUCTURED DOCUMENTS

BACKGROUND

Documents may be classified as being members of one or more groups or classes using a number of probabilistic techniques based on the textual content and semantics of each document. These types of classifications are often made based on the presence of specific words that are observed in documents belonging to the class. For example, if an email message contains the words "Nigeria" and "million," these facts may contribute to the probability that the message is junk mail.

Such classifications may not work as well with email messages and other documents of more nuanced classes, such as "marketing." While marketing emails may be identifiable via the presence of words such as "coupon," "promotion," or "newsletter," many emails that should be classified as "marketing" often contain nothing other than hyperlinked images, thus defying text-based semantic classification. Other types of text-bearing marketing emails generated by retailers, particularly those operating online, may include a grid of products, where the individual products change each time the email is sent out. If the name of a given product is only observed in a single email, for example, a traditional classifier would not have prior context with which to identify the email with the "marketing" classification.

It is with respect to these and other considerations that the disclosure made herein is presented.

BRIEF DESCRIPTION OF THE DRAWINGS

FIG. 2 is a block diagram showing an illustrative structure of a document, according to embodiments presented herein;

FIG. 3 is a block diagram showing an illustrative structure of a document created from a same or similar template as the document in FIG. 2, according to embodiments presented herein;

DETAILED DESCRIPTION

Figure 1:
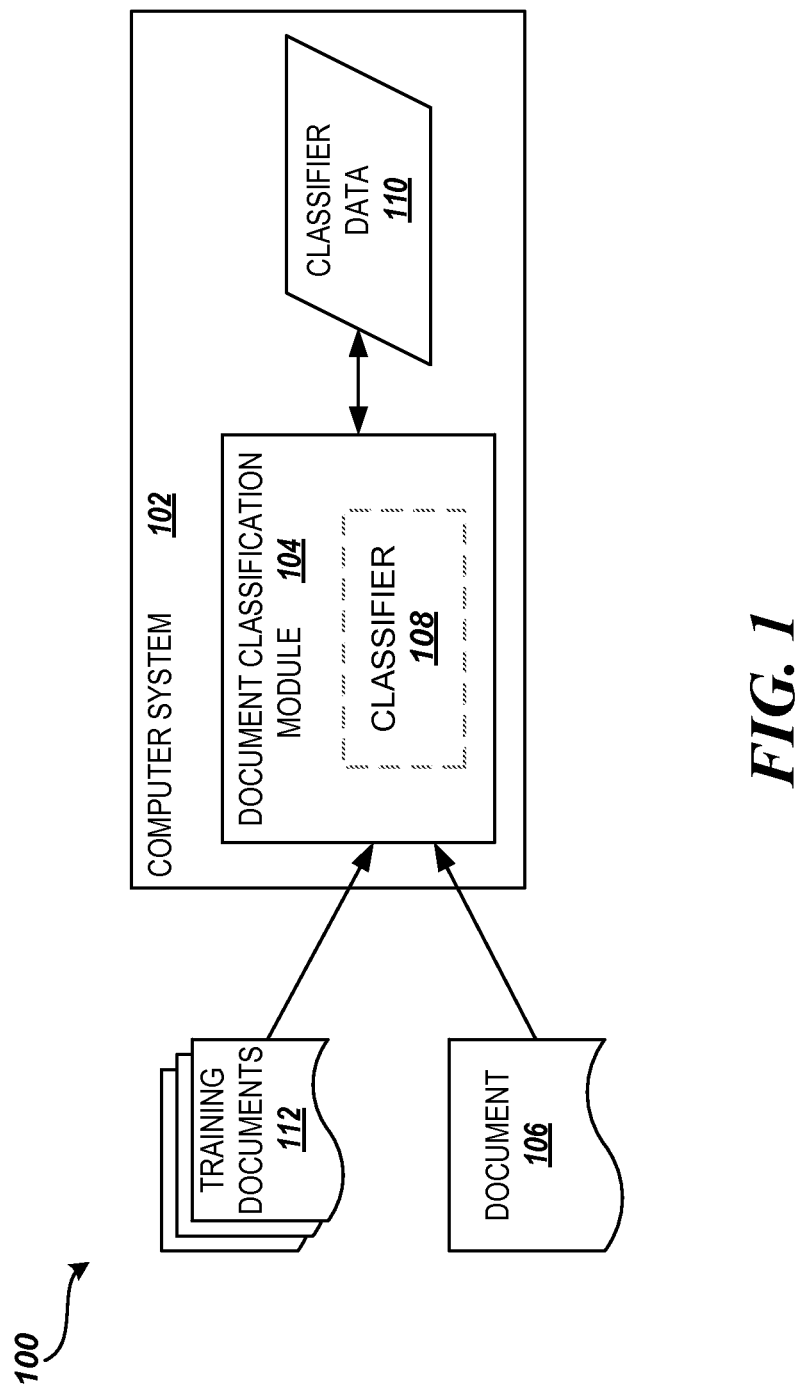
FIG. 1 is a system diagram showing aspects of an illustrative operating environment for classifying structured documents based on their structure, including several software and hardware components provided by embodiments presented herein.

The following detailed description is directed to technologies for classifying structured documents based on the structure of the document. Utilizing the technologies described herein, documents may be classified or categorized based on their structure, such as an HTML node hierarchy, rather than textual content and/or semantics. Classifying documents based on their structure allows documents of a similar type to be identified, irrespective of content. This may be useful for classifying instances of documents produced from a particular template or using a common toolset in which the content changes between each observed instance, such as marketing newsletters featuring a grid of N products, for example. This may also be useful for classifying documents that would otherwise be difficult to analyze due to lack of semantic text in the document, such as a marketing email containing only hyperlinked images. Further, this technique may be used to identify documents that bear similarities despite widely varied textual content, like promotional documents generated from similar templates but in different languages.

According to embodiments, a structured document is received, and the structural elements are parsed from the document to generate a text string representing the structure of the document instead of the semantic textual content of the document. The text string may be broken into N-grams utilizing a sliding window, and a classifier trained from similar structured documents labeled as belonging to one of a number of document classes is utilized to determine a probability that the document belongs to each of the document classes based on the N-grams.

It should be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a system and network diagram that shows an illustrative operating environment 100 including several software components for classifying structured documents based on the structure of the document. The environment 100 includes a computer system 102. The computer system 102 may represent a single computing device, such as a server computer, desktop workstation, personal computer ("PC"), laptop, notebook, consumer electronics device, and the like, or the computer system may represent a combination of computing devices connected together by one or more communication networks. The computer system 102 may further represent one or more virtual machines executing on a number of host computing devices.

A document classification module 104 executes in the computer system 102. According to embodiments, the document classification module 104 classifies or categorizes documents, such as document 106, based on the structure of the document, as will be described in more detail below. The document classification module 104 may execute on a single virtual machine, server, or other computing device in the computer system 102, or the document classification module 104 may execute in parallel across multiple virtual machines, servers, or other computing devices. In addition, the document classification module 104 may comprise a number of subcomponents executing on different virtual machines, servers, or other computing devices in the computer system 102. The document classification module 104 may be implemented as software, hardware, or any combination of the two.

The document 106 may represent any structured document to be classified, such as an HTML or XML-based email message, a Web page, an XML file, a Portable Document Format ("PDF") file, an application document, and the like. In some embodiments, the document 106 represents an HTML-based email message containing a periodic promotional newsletter or advertisement, an order confirmation, a shipping or delivery confirmation for an order, or the like. It will be appreciated that documents containing marketing information, such as promotional newsletters, or order-related information, such as order and shipping confirmations, are likely generated by the organization creating the document using a template that defines the overall document structure, with specific product or order information injected into specific, defined locations in the template.

According to embodiments, the document classification module 104 utilizes a machine learning technique known as statistical classification to determine a class or category of documents to which the document 106 belongs based on observed features in the document and features observed in documents known to belong to defined classes of documents. The document classification module 104 utilizes a classifier 108, such as a naïve Bayes classifier, to calculate the probability of membership in a class for the document 106 given the likelihood of observing structural features observed for that class. Bayesian classifiers may be used to make binary decisions about a particular document 106, such as "is this document junk mail," "is this document related to financial fraud," "is the tone of this document angry," and the like. The document classification module 104 may maintain classifier data 110 that supports the algorithm of the classifier 108. The classifier data 110 may be stored in a file system of the computer system 102 or in a data storage system, such as a database, accessible to the computer system, for example.

In additional embodiments, the document classification module 104 may further train the classifier 108 utilizing a number of training documents 112 that have already been labeled with a document class or category. In some embodiments, the document classification module 104 may initially group the training documents into possible classifications using content-related techniques. For example, the document classification module 104 may utilize regular expressions to locate order IDs in training documents 112 containing order confirmation email messages or tracking IDs in training documents containing shipment or delivery confirmations. Similarly, the document classification module 104 may search for known content in the training documents 112 in order to initially classify the training documents, such as links to specific websites or webpages. Alternatively or additionally, the training documents 112 may be manually labeled by administrators of the computer system 102 or through crowd-sourcing techniques, for example, before being used by the document classification module 104 to train the classifier 108.

FIG. 2 shows one example of a structured document 106A that may be classified by the document classification module 104 using the classifier 108 or that was utilized to train the classifier. The document 106A shown in FIG. 2 may represent a periodic promotional newsletter sent to customers as an HTML-based email message, for example. As shown in FIG. 2, the document 106A may comprise a header area 202 containing information identifying the organization sending the promotional newsletter and links to locations or addresses on the organization's website. The document 106A may further comprise a body advertisement 204 containing promotional information regarding a product, promotion, discount, event, or other program offered by the organization. The document 106A may further comprise one or more specific graphical elements, such as the horizontal separator 206 shown in FIG. 2, in distinct locations in the document. The document 106A may also comprise a footer area 208 containing terms and conditions for the promotion or program, contact information for the organization, and the like.

Figure 3:
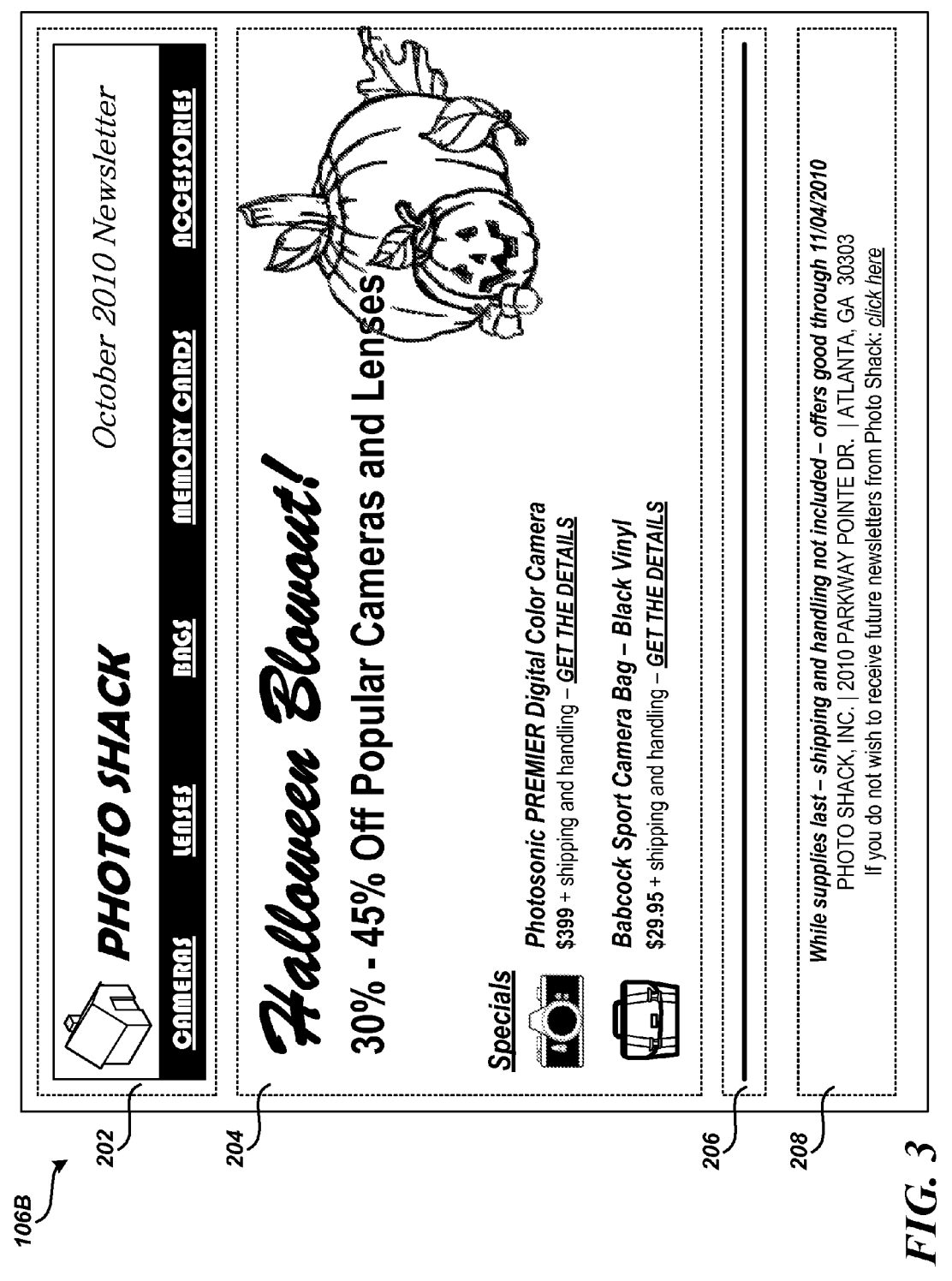

As described above, the document 106A may be generated from a template, with specific product or marketing information injected into the defined areas 202, 204, and 208 of the template. For example, FIG. 3 shows another example of a structured document 106B that may be generated from the same template as the document 106A shown in FIG. 2 and described above. As shown in the figure, the document 106B contains different content in the header area 202, body advertisement 204, and footer area 208, while retaining the same overall structure of the document 106A. It will be appreciated that any or all of these areas may consist solely of hyperlinked images, organized in tables and/or other HTML structures, and may contain no textual content whatsoever. Similarly, some areas, such as the footer area 208, may consist of textual content or a combination of textual content, images, and hyperlinks.

In order to classify the document 106 or to train the classifier 108, a text string may be generated from the document representing the overall structure of the document. For example, the document classification module 104 may extract a text string from the markup of the HTML-based email message shown in FIG. 2 comprising one word per HTML tag in the order that the tags occur within the document. This may yield a text string such as that shown in Table 1 below. Note that parentheticals identifying the different areas 202-208 of the document 106A shown in FIG. 2 are added to the text string in Table 1 for clarity and would not be present in the text string actually used for classification.

TABLE 1

Sample Text String Derived from Markup of Document (Header Area 202)

<div> <table> <tbody> <tr> <td>
<div> <table> <tbody> <tr> <td>
<p> <img />
</p> </td> </tr>

(Header links)

<td> <td> <p> <span> <img /> <b>
<a> <span> </span> </a>
<a> <span> </span> </a>
<a> <span> </span> </a>
<a> <span> </span> </a>
<a> <span> </span> </a>
<a> <span> </span> </a>
</b> <a> </a>
</span> </p>
</td> </tr> </tbody> </table> </div>
</td> </tr> </tbody> </table> </div>

(Body Advertisement 204)

<p> <span> <a> <img /> </a> </span> </p>

(Horizontal Separator 206)

<p>
<div> <table> <tbody> <tr> <td>
<span> <o> </o> </span>
</td> </tr> </tbody> </table> </div>

(Footer Area 208)

<div>
<ul:p> </ul:p>
<ul:p> </ul:p>
<ul:p> </ul:p>
<ul:p> </ul:p>
<table> <tbody>
<tr> <td>
<p> <span> <img /> </span> </p>
</td> </tr>
<tr> <td> <p> <span> </span> </p> </td> </tr>
<tr> <td> <p> <span> <img /> </span> </p> </td> </tr>
<tr> <td> <p> <b> <span> <ul:p> </ul:p> </span> </b> </p> </td> </tr>
<tr> <td> <p> <span> <img /> </span> </p> </td> </tr>
<tr> <td> <p> <span> <a> <span> </span> </a> <ul:p> </ul:p> </span> </p> </td>
</tr>
<tr> <td> <p> <span> <img /> </span> </p> </td> </tr>

The document classification module 104 may then utilize the classifier 108 to classify the document 106 from the text string. Because the "vocabulary" of HTML tags that indicate document structure is small, however, independent observations regarding the presence or absence of a given HTML tag may not be sufficient to identify membership of the document 106 in a particular class or category of documents. For example, there may be no HTML tags which occur only in marketing documents. Accordingly, the document classification module 104 may apply additional techniques to the text classification to improve the accuracy of the classifier 108, according to some embodiments. For example, the document classification module 104 may break up the text string into tuples of some number N of words, referred to as "N-grams," using a sliding window, and apply the classifier 108 to the extracted N-grams. Utilizing N-grams in the classification may provide context to the extracted structural elements. For example, "Western Union" occurring as a 2-word tuple, or "bigram," carries a much higher probability of being associated with fraud than the bigrams "Western European" or "European Union." Combining the words in the order that they occur in the text string provides the semantic context.

Using N-grams comprising sequences of HTML tags extracted from the text string representing the document structure provides for more accurate comparison/classification of documents. In addition, utilizing N-grams may provide better performance than a straight comparison of each individual word or HTML tag in the document 106, since documents generated from a same template may bear only slight modifications from instance to instance. For example, one marketing message may contain a 4×3 product grid. Another marketing message from the same author may contain a 4×7 product grid, where 4 more rows of products have been added. In addition, documents of a specific type may contain similar features even when produced by different authors or from different templates. If there are similar characteristics employed by the designers of a given type of document template in general, performing comparisons across document fragments comprising N-grams may allow the system to correctly identify similar documents from new authors.

It will be appreciated that an optimal value for N representing the number of words in the tuples extracted from the text string may depend on the corpus of documents being classified, and may be determined from experimentation. In addition, N-grams of two or more different lengths, such as 3 words and 5 words, may be extracted from the same text string and utilized independently or in conjunction by the classifier 108. It will be further appreciated that other methods of grouping of the structural elements may be utilized by the document classification module 104 beyond the N-grams described herein.

In addition to the overall document structure, additional metadata or other information may be derived from the document 106 and added to the text string to increase the efficacy of the classifier 108, according to further embodiments. For example, an identifier unique to each document author, such as a sender ID or customer ID, could be added as a word or words to the text string that represents the document structure in order to relate documents 106 to authors. The ID representing the author of a document 106 may provide an additional feature upon which to train the classifier 108 and/or classify the document. In practice, this could be represented as a textual token such as "AUTHOR: 192383", where "192383" represented the identifier unique to the document author. This textual token would be prepended or appended to the text string representing the document structure, as presented in Table 1. However, because the document classification module 104 compares N-grams representing the complete structure of the document, the author feature need not be present in a candidate document 106 in order to produce a match.

In further embodiments, the overall complexity of a document 106 may provide an additional data point for the classification of documents. The complexity of a document 106 may be determined from the number of HTML tags in the document, the number of different tags in the document, the maximum depth of nested HTML tags, and/or the like. According to one embodiment, a real number in the range of 0.0 to L, where L is normalized, may be calculated to represent the overall complexity of a given document 106. Documents 106 having a small number of HTML tags will be given a very low number while documents with many tags, many different tags, and/or a deeply-nested structure will be given a higher number. This complexity value may be used as a coefficient for the probability score for a particular class determined by the classifier 108, for example. This would allow strongly similar documents 106 that are very simple to be weakly correlated, and would likewise increase the correlation for moderately similar but very complex documents.

Alternatively or additionally, the calculated complexity value for a document 106 may be added as a word to the text string representing the structure of the document and used in the classification. For example, the "word" "COMPLEXITY:0.7" may be prepended or appended to the text string. Similarly, words representing the various complexity components of the document 106, such as "NUMBER_OF_ELEMENTS:250," "NUMBER_OF_DISTINCT_ELEMENTS:45," and/or "MAX_NODE_DEPTH:5," may be added to the text string to associate each document with its overall complexity.

Figure 4:
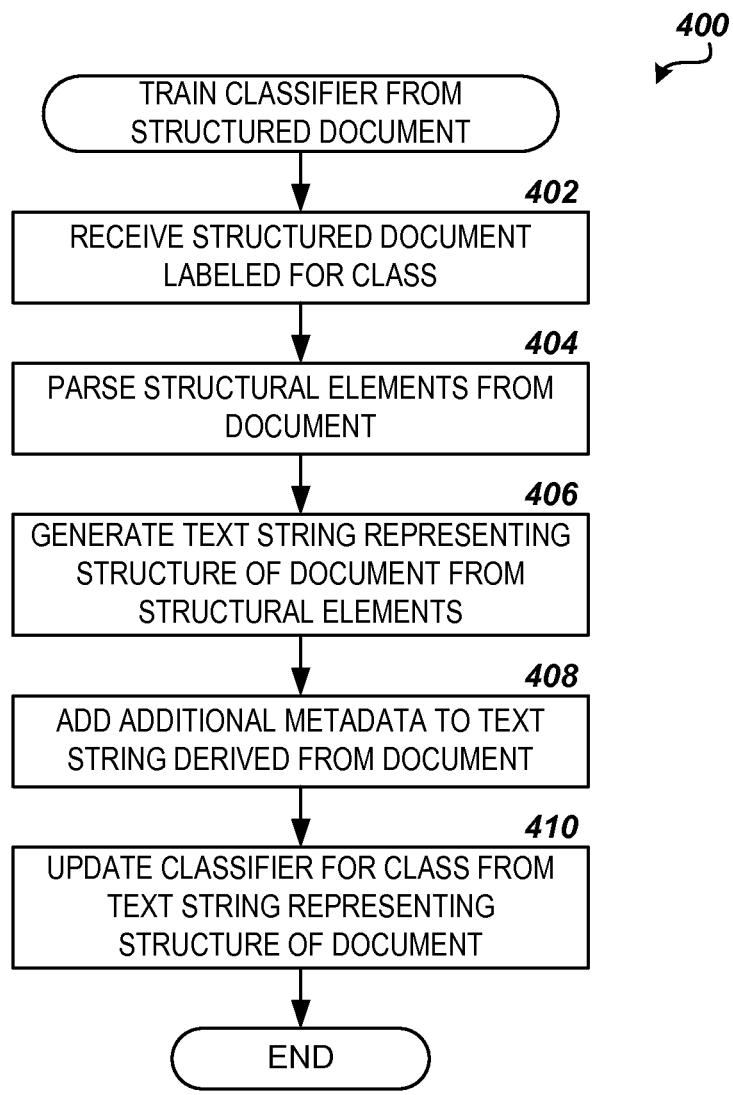
FIG. 4 is a flow diagram for a method of training a classifier from a document labeled as belonging to a particular document class or category, according to embodiments described herein.
Figure 5:
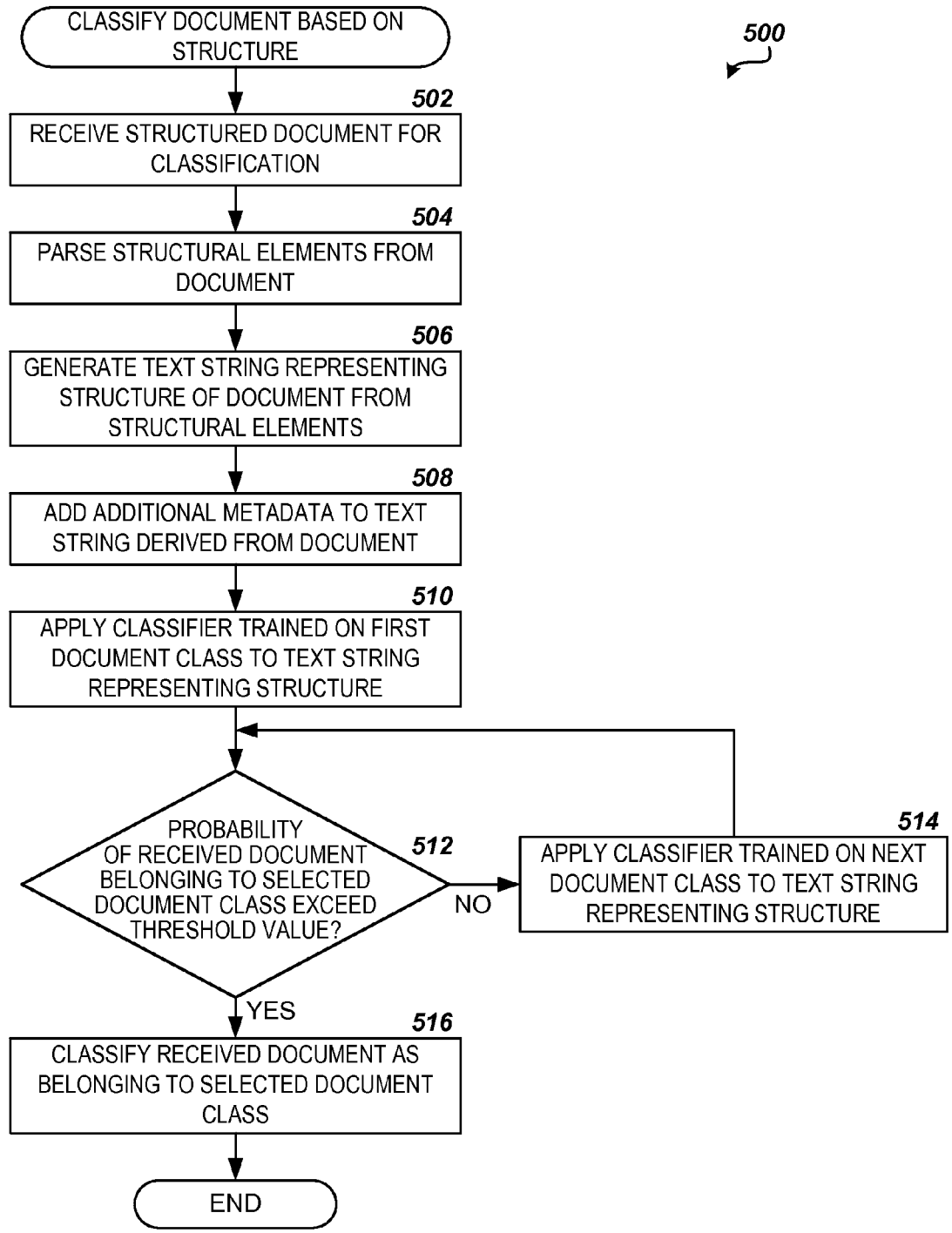
FIG. 5 is a flow diagram for a method of classifying a document based on its structure, according to embodiments described herein.

Turning now to FIGS. 4 and 5, additional details will be provided regarding the embodiments described herein for classifying structured documents based on the structure of the document. It should be appreciated that the logical operations described herein are implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 4 illustrates a routine 400 for training a classifier 108 from a document labeled as belonging to a particular document class or category, according to one embodiment described herein. The routine 400 may be performed by the document classification module 104, as described above in regard to FIG. 1. It will be appreciated that the routine 400 may also be performed by other modules or components executing in the computer system 102, or by any other combination of modules and components. It will be further appreciated that, while the routine 400 is described as a sequence of operations, groups of operations may be performed at different times, and some operations may be performed iteratively using the outputs of previously performed operations.

The routine 400 begins at operation 402, where the document classification module 104 receives a structured document 106 that has been labeled as belonging to a particular class or category. The document 106 may be labeled by a combination of textual content analysis performed by the document classification module 104 or other module or process and/or manual analysis of the document's contents, as described above. In some embodiments, the document classification module 104 receives a number of training documents 112 labeled as to class or category from which to train the classifier 108. The routine 400 proceeds from operation 402 to operation 404, where the document classification module 104 parses the structural elements from the received structured document 106. For example, as described above in regard to FIG. 2, the document classification module 104 may parse the HTML tags from the document 106 comprising an HTML-based email message identified as a "marketing" document.

From operation 404, the routine 400 proceeds to operation 406, where the document classification module 104 generates a text string representing the structure of the received document 106 from the parsed structural elements. For example, as further described above in regard to FIG. 2, the document classification module 104 may walk the markup parsed from the HTML-based email message to generate a text string comprising one word per HTML tag in the order that the tags occur within the document. This may yield a text string such as that shown in Table 1 above. It will be appreciated that the HTML tags that define the structure of the document 106 may specify particular attributes that increase their uniqueness as to the classification of the document. For example, a "<TABLE>" tag in a document 106 may specify "height", "width", "rows," and/or "column" attributes, amongst others. Similarly, a "<SPAN>" tag may specify a "style" attribute, amongst others. According to further embodiments, certain attributes or attribute/value pairs for certain HTML tags or all HTML tags in the document 106 may be added as words in the text string adjacent to the corresponding HTML tag to further differentiate the structure of the document.

The routine 400 proceeds from operation 406 to operation 408, where the document classification module 104 may add additional metadata to the text string representing the structure of the document to increase the efficacy of the classifier 108, according to further embodiments. For example, the document classification module 104 may prepend or append a "word" or words to the text string representing the author of the document, the complexity of the document, and the like, as described above in regard to FIG. 2.

From operation 408, the routine proceeds to operation 410, where the document classification module 104 updates the classifier 108 for the specified class or category of document from the text string representing the structure of the received document 106. The method used to update the classifier 108 may depend on the type of classifier implemented by the document classification module 104. For example, the document classification module 104 may implement an N-gramming Bayesian classifier 108 that breaks up the text string into a sliding window of N-grams while calculating the probabilities that a second N-gram occurs after a first N-gram in a set of training documents 112 labeled as a particular class or category. The classifier 108 may maintain these probabilities in a probability matrix for the various N-grams identified in the training documents 112. It will be appreciated that the document classification module 104 may employ other methods of grouping structural elements from the document 106 beyond the N-grams described herein.

The document classification module 104 may utilize the algorithm of the classifier 108 to update the probability matrix from the text string representing the structure of the received document 106, and store the update probability matrix and other data defining the classifier 108 in the classifier data 110, according to some embodiments. It will be appreciated that other classifiers 108 beyond the naïve Bayes classifier described herein may be utilized by the document classification module 104 to classify documents 106 based on their structure, and that the corresponding classifier algorithm may encompass a mechanism for updating the classifier from the text string representing the structure of a received document labeled as belonging to a particular class or category. From operation 410 the routine 400 ends.

FIG. 5 illustrates a routine 500 for classifying a document 106 based on its structure utilizing a classifier 108 trained from training documents 112 labeled as belonging to a particular class or category, according to one embodiment described herein. The routine 500 may be performed by the document classification module 104, as described above in regard to FIG. 1. It will be appreciated that the routine 500 may also be performed by other modules or components executing in the computer system 102, or by any other combination of modules and components. It will be further appreciated that, while the routine 500 is described as a sequence of operations, groups of operations may be performed at different times, and some operations may be performed iteratively using the outputs of previously performed operations The routine 500 begins at operation 502, where the document classification module 104 receives a structured document 106 to be classified. For example, the document classification module 104 may receive an HTML-based email message as described above in regard to FIG. 2. Next, the routine 500 proceeds to operation 504, where the document classification module 104 parses the structural elements from the received structured document 106, then to operation 506, where the document classification module 104 generates a text string representing the structure of the document 106 from the parsed structural elements, and to operation 508, where the document classification module 104 adds any additional metadata to the text string representing the structure of the document 106 to increase the efficacy of the classifier 108. It will be appreciated that operations 504, 506, and 508 will be performed on the received document 106 by the document classification module 104 in a substantially identical fashion as described above in regard to operations 404, 406, and 408 in order for the trained classifier 108 to properly classify the received document.

From operation 508, the routine 500 proceeds to operation 510, where the document classification module 104 presents the text string representing the structure of the received document 106 to the classifier 108 for a first class or category of documents. As described herein, the classifier 108 may be trained from training documents 112 labeled as belonging to a number of different classes or categories. The document classification module 104 may select a first of the known document classes and present the text string representing the structure of the document 106 to the classifier 108 for the selected class. According to embodiments, the classifier 108 utilizes the classifier algorithm to calculate a probability that the received document 106 belongs to the selected document class based on observances in the training documents 112 labeled as belonging to that class.

For example, the N-gramming Bayesian classifier 108 described above in regard to operation 510 may break up the text string representing the structure of the document into a sliding window of N-grams and identify instances of a second N-gram occurring after a first N-gram in the test string. The classifier 108 may then accumulate the probabilities of these occurrences from the probability matrix for the various N-grams identified in the training documents 112 in operation 510 and maintained in the classifier data 110, for example. The accumulated probabilities represent the probability that the received document belongs to the selected class, according to some embodiments. It will be appreciated that other methods of calculating the probability that the received document 106 belongs to the selected document class may be utilized, based on the type of classifier 108 utilized by the document classification module 104.

The routine 500 proceeds from operation 510 to operation 512, where the document classification module 104 determines if the calculated probability of the received document 106 belonging to the selected document class exceeds some threshold value. The threshold value may be set high enough to ensure that the classification of the received document 106 is performed with a high degree of certainty, such as 80%. If the calculated probability of the received document 106 belonging to the selected document class does not exceed the threshold value, then the routine 500 proceeds from operation 512 to operation 514, where the document classification module 104 presents the text string representing the structure of the received document 106 to the classifier 108 for a next class or category of documents, using the same methodology as described above in regard to operation 510.

If the calculated probability of the received document 106 belonging to the selected document class does exceed the threshold value, then the routine 500 proceeds from operation 512 to operation 516, where the document classification module 104 classifies the received document 106 as belonging to the selected document class. Alternatively, the document classification module 104 may present the text string representing the structure of the received document 106 to the classifier 108 for each of the known document classes, and select the document class having the highest calculated probability as determined by the classification for the received document. From operation 516, the routine 500 ends.

Figure 6:
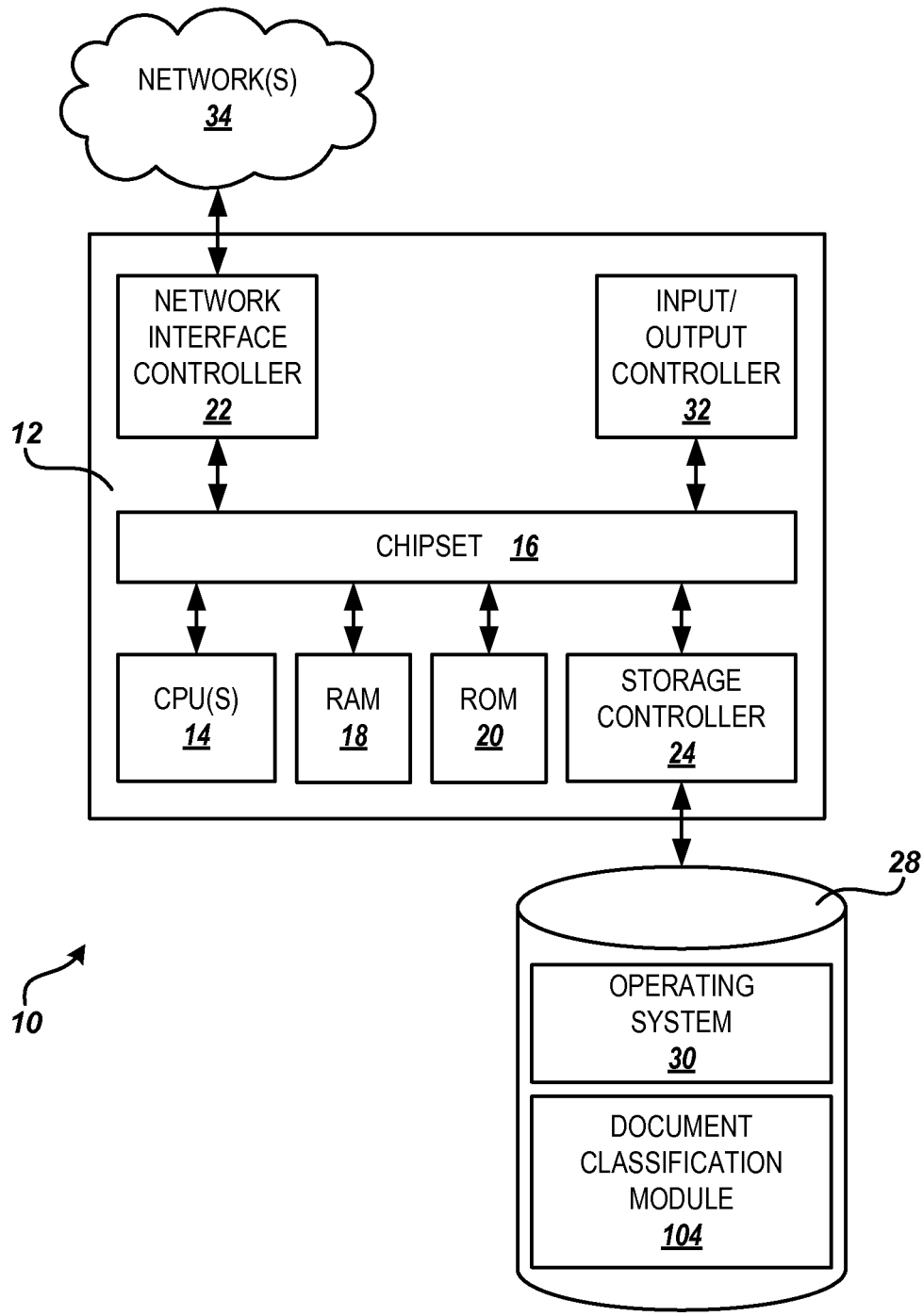
FIG. 6 is a computer architecture diagram showing an illustrative computer hardware architecture for computing devices described in embodiments presented herein.

FIG. 6 shows an example computer architecture 10 for a computing device 12 capable of executing the software components described herein for classifying structured documents based on the structure of the document, in the manner presented above. The computer architecture 10 shown in FIG. 6 illustrates a conventional server computer, workstation, desktop computer, laptop, PDA, electronic book reader, digital wireless phone, network appliance, set-top box, or other computing device, and may be utilized to execute any aspects of the software components presented herein described as executing in the computer system 102 or other computing platform.

The computing device 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computing device 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 16 provides an interface between the CPUs 14 and the remainder of the components and devices on the baseboard. The chipset 16 may provide an interface to a random access memory ("RAM") 18, used as the main memory in the computing device 12. The chipset 16 may further provide an interface to a computer-readable storage medium such as a read-only memory ("ROM") 20 or non-volatile RAM ("NVRAM") for storing basic routines that help to startup the computing device 12 and to transfer information between the various components and devices. The ROM 20 or NVRAM may also store other software components necessary for the operation of the computing device 12 in accordance with the embodiments described herein.

According to various embodiments, the computing device 12 may operate in a networked environment using logical connections to remote computing devices and computer systems through one or more networks 34, such as local-area networks ("LANs"), wide-area networks ("WANs"), the Internet, or any other networking topology known in the art that connects the computing device 12 to the remote computing devices and computer systems. The chipset 16 includes functionality for providing network connectivity through a network interface controller ("NIC") 22, such as a gigabit Ethernet adapter. It should be appreciated that any number of NICs 22 may be present in the computing device 12, connecting the computer to different types of networks and remote computer systems.

The computing device 12 may be connected to a mass storage device 28 that provides non-volatile storage for the computer. The mass storage device 28 may store system programs, application programs, other program modules, and data, which are described in greater detail herein. The mass storage device 28 may be connected to the computing device 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computing device 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, or the like. For example, the computing device 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 12 may further read information from the mass storage device 28 by detecting the physical states or characteristics of one or more particular locations within the physical storage units.

In addition to the mass storage device 28 described above, the computing device 12 may have access to other computer-readable medium to store and retrieve information, such as program modules, data structures, or other data. It should be appreciated by those skilled in the art that computer-readable media can be any available media that may be accessed by the computing device 12, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information.

The mass storage device 28 may store an operating system 30 utilized to control the operation of the computing device 12. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized.

The mass storage device 28 may store other system or application programs and data utilized by the computing device 12, such as the document classification module 104 and/or the document classification module 104, both of which were described above in regard to FIG. 1. In one embodiment, the mass storage device 28 or other computer-readable storage media may be encoded with computer-executable instructions that, when loaded into the computing device 12, may transform the computer from a general-purpose computing system into a special-purpose computer capable of implementing the embodiments described herein. These computer-executable instructions transform the computing device 12 by specifying how the CPUs 14 transition between states, as described above. According to one embodiment, the computing device 12 may have access to computer-readable storage media storing computer-executable instructions that, when executed by the computer, perform the routines 400 or 500 for classifying structured documents based on the structure of the document, as described above in regard to FIGS. 4 and 5.

The computing device 12 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display device, such as a computer monitor, a flat-panel display, a digital projector, a printer, a plotter, or other type of output device. It will be appreciated that the computing device 12 may not include all of the components shown in FIG. 6, may include other components that are not explicitly shown in FIG. 6, or may utilize an architecture completely different than that shown in FIG. 6.

Based on the foregoing, it should be appreciated that technologies for classifying structured documents based on the structure of the document are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method of classifying documents, the method comprising executing instructions in a computer system to perform operations comprising:
    receiving a hypertext markup language (HTML) document;
    parsing HTML tags from the HTML document;
    generating a text string comprising a word for each of the HTML tags;
    deriving metadata from the HTML document;
    adding the metadata to the text string, the metadata representing a complexity value of a structure of the HTML document based upon a maximum depth of nested HTML tags in the HTML document;
    breaking the text string into N-grams utilizing a sliding window;
    utilizing a naïve Bayesian classifier trained from similar structured documents labeled as belonging to a first document class to determine a first probability that the HTML document belongs to the first document class based at least in part upon the N-grams, the naïve Bayesian classifier using the complexity value of the structure of the HTML document as a coefficient in determination of the first probability;
    classifying the document as belonging to the first document class based at least in part on the first probability that the HTML document belonging to the first document class that satisfies a threshold condition; and
    in response to the first probability not satisfying the threshold condition, utilizing the naïve Bayesian classifier trained from similar structured documents labeled as belonging to a second document class to determine a second probability that the HTML document belongs to the second document class based at least in part on the N-grams, the naïve Bayesian classifier using the complexity value of the structure of the HTML document as the coefficient in determination of the second probability.

2. The computer-implemented method of claim 1, wherein the metadata added to the text string comprises an identification of an author of the HTML document to be utilized by the naïve Bayesian classifier.

3. The computer-implemented method of claim 1, wherein the HTML document and at least one of the similar structured documents comprise HTML documents generated from a same template.

4. A system for classifying documents, the system comprising:
    a computing device; and
    a document classification module executing on the computing device and configured to at least:
    train an N-gramming classifier from a plurality of training documents, each of the plurality of training documents labeled as belonging to one or a plurality of document classes;
    receive a structured document;
    parse structural elements from the structured document;
    generate a text string representing a structure of the structured document from the structural elements, wherein the N-gramming classifier breaks the text string into N-grams utilizing a sliding window;
    derive metadata from the structured document;
    add the metadata to the text string, the metadata representing a complexity value of the structure of the structured document to be utilized by the N-gramming classifier based upon a maximum depth of nested structural elements in the structured document;
    utilize the N-gramming classifier to classify the structured document as belonging to one of the plurality of document classes based on the text string representing the structure of the structured document, the N-gramming classifier using the complexity value of the structure of the structured document as a coefficient for a first probability that the structured document belongs to one of the plurality of document classes;
    determine whether the first probability that the structured document belongs to a first document class satisfies a threshold value;
    if the first probability that the structured document belongs to the first document class satisfies the threshold value, classifying the structured document as belonging to the first document class; and if the first probability that the structured document belongs to the first document class does not satisfy the threshold value, utilizing the classifier trained from a plurality of training documents labeled as belonging to a second document class to determine a second probability that the structured document belongs to the second document class based on the text string representing the structure of the structured document.

5. The system of claim 4, wherein the N-gramming classifier comprises a naïve Bayesian classifier.

6. The system of claim 4, wherein the structured document comprises a hypertext markup language (HTML) document and wherein the text string representing the structure of the structured document comprises a word for each of the HTML tags in the HTML document.

7. The system of claim 6, wherein the text string representing the structure of the structured document further comprises a word for an attribute of at least one of the HTML tags in the HTML document.

8. The system of claim 6, wherein the structured document comprises an HTML-based email message generated from a template.

9. The system of claim 4, wherein the metadata added to the text string comprises an identification of an author of the structured document to be utilized by the N-gramming classifier in classifying the structured document.

10. A non-transitory computer-readable storage medium having computer-executable instructions stored thereon that, when executed by a computing device, cause the computing device to at least:
   receive a structured document;
   parse structural elements from the structured document;
   generate a text string representing a structure of the structured document from the structural elements, wherein the text string does not comprise textual content from the structured document;
   derive metadata from the structured document;
   add the metadata to the text string, the metadata representing a complexity value of the structure of the structured document based at least in part upon a maximum depth of nested structural elements in the structured document;
   group structural elements in the text string into N-grams utilizing a sliding window;
   utilize a classifier trained from a plurality of training documents labeled as belonging to a first document class to determine a probability that the structured document belongs to the first document class based on the N-grams, the classifier using the complexity value of the structure of the structured document as a coefficient for a first probability that the structured document belongs to the first document class, wherein the complexity value has a relatively lower value for a first set of documents that are similar and include a simple structure while the complexity value has a relatively higher value for a second set of documents that are relatively less similar and include a relatively more complex structure as compared to the first set of documents;
   determine whether the first probability that the structured document belongs to the first document class satisfies a threshold value;
   if the first probability that the structured document belongs to the first document class satisfies the threshold value, classifying the structured document as belonging to the first document class; and
   if the first probability that the structured document belongs to the first document class does not satisfy the threshold value, utilizing the classifier trained from a plurality of training documents labeled as belonging to the second document class to determine a second probability that the structured document belongs to the second document class based on the text string representing the structure of the structured document.

11. The non-transitory computer-readable storage medium of claim 10, comprising further computer-executable instructions that cause the computing device to at least:
   present the text string representing the structure of the structured document to the classifier trained from training documents for each of a plurality of document classes; and
   classify the structured document as belonging to the document class from the plurality of document classes having a highest probability of the document belonging to the first document class as determined by the classifier based on the text string representing the structure of the structured document.

12. The non-transitory computer-readable storage medium of claim 10, wherein the classifier comprises a naïve Bayesian classifier.

13. The non-transitory computer-readable storage medium of claim 10, wherein the structured document comprises a hypertext markup language (HTML) document and wherein the text string representing the structure of the structured document comprises a word for each of the HTML tags in the HTML document.

14. The non-transitory computer-readable storage medium of claim 10, wherein the structured document and at least one of the plurality of training documents comprise hypertext markup language (HTML) documents generated from a same template.

15. The non-transitory computer-readable storage medium of claim 10, wherein the metadata added to the text string comprises an identification of an author of the structured document to be utilized by the classifier.

16. The computer-implemented method of claim 1, wherein adding the metadata to the text string comprises appending the complexity value as a word to the text string.

17. The system of claim 4, wherein adding the metadata to the text string comprises appending the complexity value as a word to the text string.

18. The non-transitory computer-readable storage medium of claim 10, wherein adding the metadata to the text string comprises appending the complexity value as a word to the text string.

19. The system of claim 4, wherein the complexity value has a relatively lower value for a first set of documents that are similar and include a simple structure while the complexity value has a relatively higher value for a second set of documents that are relatively less similar and include a relatively more complex structure as compared to the first set of documents.

20. The non-transitory computer-readable storage medium of claim 10, wherein the complexity value is further based at least in part on at least one of a number of tags in the structured document or a number of different tags in the structured document.

21. The non-transitory computer-readable storage medium of claim 10, wherein the complexity value is between 0 and L, where L is a normalized value.

* * * * *